United States Patent [19]
Conner et al.

[11] Patent Number: 5,671,083
[45] Date of Patent: Sep. 23, 1997

[54] SPATIAL LIGHT MODULATOR WITH BURIED PASSIVE CHARGE STORAGE CELL ARRAY

[75] Inventors: James L. Conner, Rowlett; Mike Overlaur; Rohit L. Bhuva, both of Plano, all of Tex.

[73] Assignee: Texas Instruments Incorporated, Dallas, Tex.

[21] Appl. No.: 382,566

[22] Filed: Feb. 2, 1995

[51] Int. Cl.$^6$ .................................................. G02B 26/00
[52] U.S. Cl. ............................................................ 359/291
[58] Field of Search ............................................. 359/291

[56] References Cited

U.S. PATENT DOCUMENTS

| | | | |
|---|---|---|---|
| 4,626,920 | 12/1986 | Glenn | 358/234 |
| 4,638,309 | 1/1987 | Ott | 359/291 |
| 5,061,049 | 10/1991 | Hornbeck | 359/224 |
| 5,079,544 | 1/1992 | DeMond et al. | 340/701 |
| 5,105,369 | 4/1992 | Nelson | 364/525 |
| 5,278,652 | 1/1994 | Urbanus | 358/160 |
| 5,535,047 | 7/1996 | Hornbeck | 359/295 |

*Primary Examiner*—Georgia Y. Epps
*Assistant Examiner*—Thomas Robbins
*Attorney, Agent, or Firm*—Robert C. Klinger; James C. Kesterson; Richard L. Donaldson

[57] ABSTRACT

A monolithic DMD spatial light modulator (20) including a storage cell array (24) of charge storage elements (30). Each charge storage cell (30) is formed using robust MOS processes, and comprises a pair of capacitors (32) having a polysilicon electrode fabricated over a substrate, and separated by a thin oxide dielectric. Each capacitor (32) is shielded by several light impermeable metal shields (37, 64, 66, 68, 72, 74, 80, 82, 88) to prevent discharging due to light incident to SLM (20). The substrate electrode (38) is encompassed by an n+ doped region (42) providing a source of minority carriers to an inversion region under the polysilicon electrode (50).

16 Claims, 10 Drawing Sheets

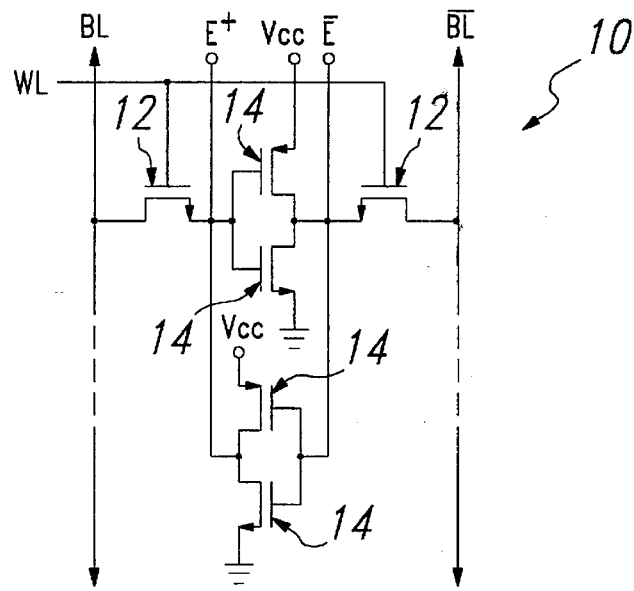
Fig. 1 PRIOR ART
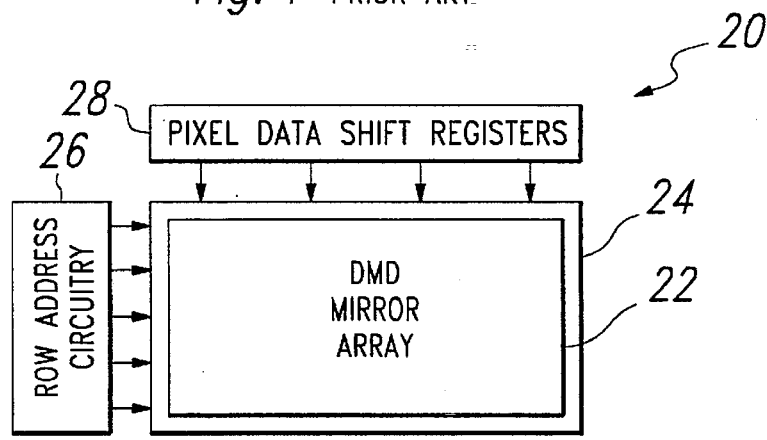
Fig. 2
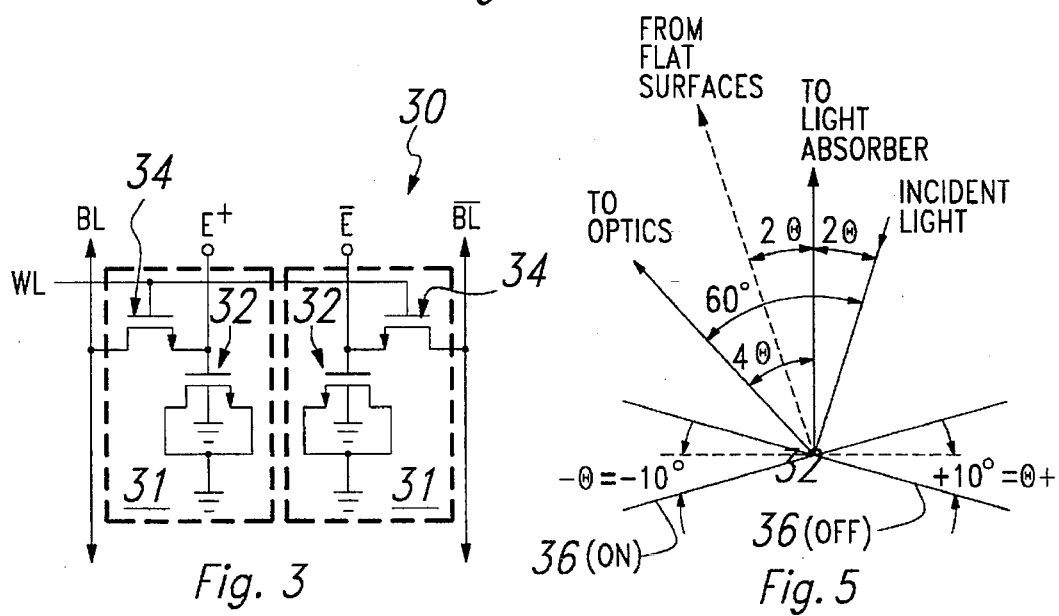
Fig. 3
Fig. 5

5,671,083

SPATIAL LIGHT MODULATOR WITH BURIED PASSIVE CHARGE STORAGE CELL ARRAY

CROSS REFERENCE TO RELATED APPLICATIONS

Cross reference is made to the following co-pending patent applications, each being assigned to the same assignee as the present invention and the teachings incorporated herein by reference:

| Ser. No. | Date Filed | Title |
| --- | --- | --- |
| 08/300,356 Patent 5,548,301 | 09/02/94 | Pixel Control Circuitry for Spatial Light Modulator |
| 08/346,812 Patent 5,610,624 | 11/30/94 | Spatial Light Modulator with Reduced Possibility of an On State Defect |
| 08/346,707 | 11/30/94 | Memory Cell with Single Bit Line Read Back |
| 08/373692 | 01/17/95 | Monolithic Programmable Format Pixel Array |
| 08/171,303 Patent 5,583,688 | 12/21/93 | Improved Multi-Level Digital Micromirror Device |

FIELD OF THE INVENTION

The present invention is generally related to spatial light modulators for modulating incident light to form an optical light image, and more particularly, to a digital micromirror device (DMD) having an array of micromirrors fabricated over addressing circuitry including a charge storage cell array.

BACKGROUND OF THE INVENTION

Spatial Light Modulators are widely used in the industry for video monitors, graphic displays, projectors, and hard copy printers. Spatial light modulators typically modulate incident light to form a light image. This light image is directed to a screen in the case of a projector, video monitor or display, or is ultimately focused on a light sensitive material, such as a photoreceptor drum, in the case of a xerographic printer.

A recent innovation of Texas Instruments Incorporated of Dallas, Tex. is the digital micromirror device (DMD). The DMD is a spatial light modulator suitable for use in displays, projectors and hard copy printers. The DMD is a monolithic single-chip integrated circuit, comprised of a high density area array of 17 micron square deflectable micromirrors. These mirrors are fabricated over address circuitry including an array of memory cells and address electrodes, these memory cells being controlled by a row address circuit and loaded/unloaded by column pixel data sheet registers. Each mirror forms one pixel of the DMD array, and is bistable through electrostatic attraction forces, that is to say, stable in one of two deflected positions. A source of light is directed upon the mirror array, and is reflected in one of two directions by each mirror. In one stable "on" mirror position, incident light is reflected by the mirror to a collector lens and focused on the display screen, or directed to the photoreceptor drum, and comprises one pixel. In the other "off" mirror position, light directed on the mirror is deflected to a light absorber. Each mirror of the array is individually controlled to either direct incident light into the collector lens, or, to the light absorber. The collector lens is used in combination with a light prism to ultimately focus and magnify the light image from the pixel mirrors when projected onto a display screen to produce a viewable image. If each pixel mirror of the DMD array is in the "on" position, the light image will be a bright array of pixels.

For a more detailed discussion of the DMD device, cross reference is made to U.S. Pat. No. 5,061,049 to Hornbeck, entitled "Spatial Light Modulator and Method"; U.S. Pat. No. 5,079,544 to DeMond, et al, entitled "Standard Independent Digitized Video System"; and U.S. Pat. No. 5,105,369 to Nelson, entitled "Printing System Exposure Module Alignment Method and Apparatus of Manufacture", each patent being assigned to the same assignee of the present invention, and the teachings of each are incorporated herein by reference. Gray scale of the pixels forming the image is achieved by pulse width modulation techniques of the mirrors, such as that described in U.S. Pat. No. 5,278,652, entitled "DMD Architecture and Timing for Use in a Pulse-Width Modulated Display System", assigned to the same assignee of the present invention, and the teachings of each are incorporated herein by reference.

In prior art DMD devices, the addressing circuitry for controlling the deflection of the micromirrors includes a pair of opposing address electrodes, one located beneath each side of the micromirror axis of rotation. These address electrodes are driven by underlying memory cells to achieve an electrostatic force and rotate the mirrors. These memory cells typically comprise static random access memory (SRAM) cells, each comprised of a six transistor arrangement, such as that shown in FIG. 1. In the prior art, one SRAM cell 10 can be provided for each pixel mirror, or, one memory cell can be associated with a plurality of pixel mirrors for controlling the mirrors using a time multiplexed technique, also known as the split reset scheme, such as that disclosed in U.S. patent application Ser. No. 08/300,356 filed Sep. 2, 1994 now U.S. Pat. No. 5,548,301, to Kornher, et al, entitled "Pixel Control Circuitry for Spatial Light Modulator", this patent application being assigned to the same assignee as the present invention, and the teachings of which are incorporated herein by reference.

As shown in FIG. 1, a typical six transistor SRAM cell 10 is an active device. That is to say, it requires a power source and ground to function properly as a memory cell. In the case of the DMD, the area array of pixel mirrors is very dense, each mirror being about 17 microns square. If one SRAM cell is provided for each pixel mirror, the array of memory cells is very dense as well. The routing of power etches across the circuit array requires a very careful circuit layout to efficiently use space, and to minimize the likelihood that shorts may be produced between circuit etches during the semiconductor fabrication or device failure. Given the complexity of the DMD architecture, even with the most careful processing techniques and circuit designs, shorts will occasionally exist between circuit etches which may render the memory cell array inoperable and which reduces production yield.

It is desired to provide an improved DMD device with addressing circuitry including a charge storage cell array that is less susceptible to fabrication defects, thereby increasing the device production yield. Moreover, it is desired to provide a DMD device with a charge storage cell array that is passive, that is to say, does not require a power source and the associated power bus etches. Ideally, a charge storage cell is provided that requires fewer transistors and less substrate area with conventional circuit layouts than a six transistor SRAM cell. This charge storage cell would allow a pixel mirror of less than 17 microns to be fabricated while still providing one charge storage cell per mirror, and which charge storage cell consumes less power than the SRAM cell. The charge storage cell should be suitable for either one cell per mirror, or, one cell per set of mirrors to support the multiplexed addressing scheme.

SUMMARY OF THE INVENTION

The present invention finds technical advantageous by providing a monolithic DMD spatial light modulator including an array of charge storage cells, the cells operating as passive devices and not requiring a power source. Each charge storage cell includes a buried capacitor with a large polysilicon electrode separated from a circuit substrate by a thin layer of oxide. At least one, and preferably several, buried layers of metal provide a light impermeable shield over this polysilicon electrode to prevent light incident on the DMD mirror array from discharging the buried capacitor.

A separate charge storage cell can be provided for each pixel mirror, thereby permitting the pixel array to be simultaneously reset which in turn reduces the write cycle time of the charge storage cell array, or, one charge storage cell can be provided for a group of pixel mirrors to achieve a multiplexed technique. The charge storage cell design is passive, has a capacitor with a large capacitance, has few transistors and consumes less power than an SRAM cell, eliminates the likelihood of shorts existing between extending power buses required in a prior art SRAM array design, and produces no shorts should a mirror collapse. With one charge storage cell being provided for each pixel, the pixel data loading scheme, which typically includes a series of shift registers for loading pixel data, is rather simple. For instance, data can be parallel loaded into the array of charge storage cells one line at a time, sequentially, without interleaving the data to rows of cells, such as that required using the split reset or time multiplexed technique. A simpler row address circuit is required. In addition, the entire array of cells can be reset, simultaneously, with one logic line. Alternatively, with one charge storage cell provided for a group of pixel mirrors, fewer charge storage cells are required.

The monolithic spatial light modulator according to the preferred embodiment of the present invention preferably comprises a plurality of pixels, and a control circuit controlling the pixels, the circuit including an array of charge storage cells positioned under the pixels. The charge storage cells preferably comprise a multi-layered semiconductor structure including a substrate, and a capacitor underlying at least one light impermeable layer. The light impermeable layer preferably comprises metal, and is comprised of portions of the metal-one, metal-two and metal-three layers, but could comprise of other light impermeable materials that are well suited for semiconductor processing techniques. The large capacitance capacitor of the charge storage cell preferably comprises one large electrode consisting of polysilicon, and a second electrode comprising a p-type substrate thereunder separated from the polysilicon electrode by a thin layer of oxide which is grown upon the substrate. This capacitor is formed using robust MOS processing technology, whereby an inversion layer is created in the underlying p-type substrate to generate capacitance.

The semiconductor structure of the preferred embodiment includes a data bus, and a pass gate coupled between the polysilicon capacitor electrode and the data bus. In the preferred embodiment, each charge storage cell includes a pair of data buses, a pair of pass gates, and a pair of capacitors, with one pass gate coupled between each data bus and one capacitor. Each pixel preferably comprises a deflectable micromirror, and the control circuit includes a pair of address electrodes coupled to one charge storage cell for controlling the mirror by electrostatic attraction. These address electrodes are each coupled to one of the underlying capacitors and are thus driven by the charge storage cell.

Other advantages of the present invention will be appreciated through a detailed reading of the following detailed description in view of the attached figures, wherein like numerals refer to like elements.

BRIEF DESCRIPTION OF THE DRAWINGS

FIG. 1 is an electrical schematic of a prior art DMD six-transistor SRAM cell, this memory cell requiring a power source and ground;

FIG. 2 is a block diagram of a monolithic DMD spatial light modulator according to the preferred embodiment of the present invention, including an array of charge storage cells;

FIG. 3 is an electrical schematic of one charge storage cell of FIG. 2, whereby each charge storage cell comprises a buried capacitor shielded by at least one light impermeable metal layer;

FIG. 5 is an illustration of the two stable deflected states of the pixel mirror shown in FIG. 4 for deflecting incident light in one of two directions;

DETAILED DESCRIPTION OF THE PREFERRED EMBODIMENT

Figure 4:
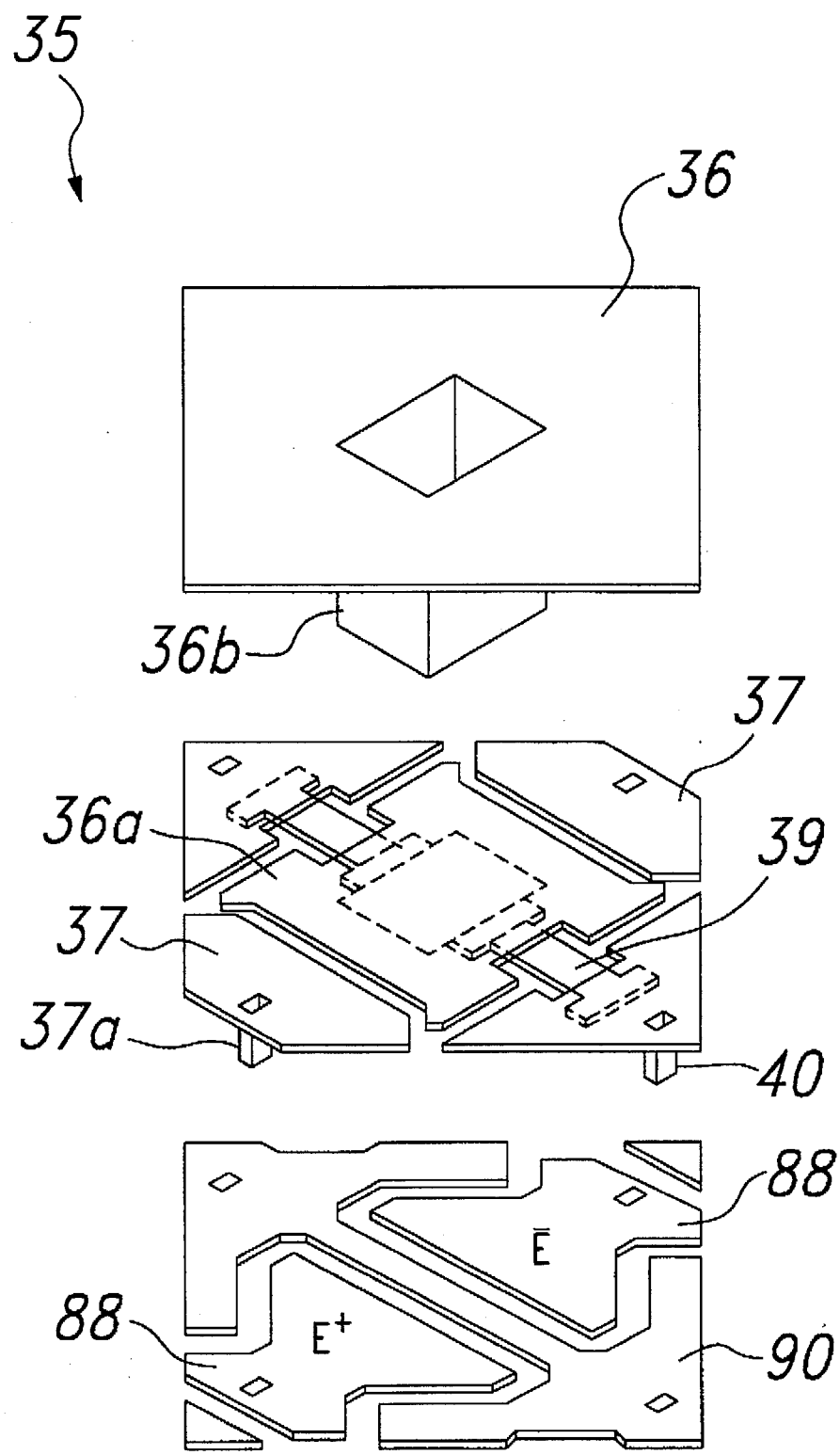
FIG. 4 is an exploded perspective view of one DMD pixel of the array shown in FIG. 2, including a deflectable micromirror fabricated upon a substrate and over one charge storage cell, this charge storage cell in turn being connected to a pair of addressing electrodes for controlling the mirror deflection by electrostatic forces.

Referring now to FIG. 1, there is shown generally at 10 a prior art SRAM cell for controlling one or more pixel mirrors fabricated thereabove, such as that described in the cross referenced patents discussed in the section entitled Background of the Invention, these patents being assigned to the same assignee as the present invention, and the teachings of which are included herein by reference. As shown in FIG. 1, a typical six-transistor SRAM cell comprises a pair of MOS pass gates 12, each pass gate 12 having a gate terminal connected to a common write line WL. Each pass transistor 12 has a drain terminal coupled to a respective bit line, BL or $\overline{BL}$, and the other source terminal connected to one electrode etch E+ or $\overline{E}$. Coupled between these electrode etches is a pair of complementary transistors forming back-to-back inverters between the bit lines and shown at 14. The gate terminals of these transistors 14 are connected to a respective electrode etch and the output of the other transistor pair. Transistors 14 are enabled when the respective pass transistor 12 is enabled by a logic "1" provided on the write line WL, and with a logic "1" provided on the respective bit line. The pairs of transistors 14 ensure that the potential on one electrode is always the compliment of the other. As can be seen in FIG. 1, each of the four transistors 14 which make up the SRAM cell 10 is seen to require a power source, shown as $V_{cc}$. The six transistor SRAM cell 10, as shown in FIG. 1, is well known in the art, with one SRAM cell being provided for one, or a set, of micromirrors, depending on whether the time multiplexed reset scheme is implemented as disclosed in the pending patent application Ser. No. 08/300,356 filed Sep. 2, 1994, entitled "Pixel Control Circuitry for Spatial Light Modulator" now U.S. Pat. No. 5,548,301.

Referring now to FIG. 2, there is shown a monolithic digital micromirror device (DMD) spatial light modulator generally shown at 20 according to the preferred embodiment of the present invention. SLM 20 is a single-chip integrated circuit seen to include an area array 22 of micro-sized mirrors 36 fabricated over an array 24 of charge storage cells 30. Addressing circuitry controlling the deflection of the mirrors includes the array 24 of charge storage cells 30, as well as a row address circuit 26, and column pixel data shift registers 28. One architecture and control scheme for SLM 20 is disclosed in the cross referenced patent application filed Jan. 17, 1995 entitled "Monolithic Programmable Format Pixel Array", with other architectures being disclosed in the cross referenced patents.

Referring now to FIG. 3, an electrical schematic of one charge storage cell comprising one of the thousands of charge storage cells of array 24 is shown generally at 30. Charge storage cell 30 is seen to comprise a pair of charge storage elements 31, each element 31 comprising a buried capacitor and associated pass transistor 34. Each buried capacitor 32 is connected to one electrode etch E+ and $\overline{E}$, with the other capacitor electrode comprising the p-type substrate thereunder. In the preferred embodiment, capacitors 32 are fabricated using robust MOS processes. One electrode of capacitor 32 is comprised of a large area of polysilicon, as will be discussed shortly. The dielectric of each capacitor 32 is comprised of a thin layer of oxide, preferably silicon oxide, silicon nitride, or combination thereof, which is grown upon the substrate like a gate oxide of a transistor. The other electrode of each capacitor 32 is comprised of the underlying p-type substrate, wherein an inversion layer is formed in the underlying p-type substrate when a potential is provided to the polysilicon electrode, much like that formed in a NMOS transistor, with the encompassing n+ doped region providing a source of minority carriers.

Each pass transistor 34 is connected across and between a respective electrode etch and the respective bit line, as shown, and are the equivalent of pass transistors 12 of FIG. 1. Each electrode etch is connected to one polysilicon electrode of capacitors 32, these electrode etches ultimately being connected to address electrodes of the associated pixel for controlling the deflection of the micromirrors as will be discussed shortly in reference to FIG. 4. The gate of each pass transistor 34 is connected to a write line WL, as shown. Each of the bit lines is shown as extending vertically, these bit lines being connected to the column pixel data shift registers 28 of FIG. 2, but could also be connected to data storage buffers, each bit line bi-directionally communicating pixel data between the shift registers 28 and associated charge storage cells 30. Hundreds of charge storage cells 30 are provided in each column of charge storage cells 30 and are connected to common bit lines BL and $\overline{BL}$, with one charge storage cell 30 preferably being provided for each micromirror. As will be discussed shortly in regards to FIGS. 6–13, each polysilicon electrode of each capacitor 32 is shielded by a respective light impermeable shield, each shield being comprised of portions of the metal-one, metal-two and metal-three layers of the integrated circuit. Thus, the charge ultimately stored on the polysilicon electrode of capacitor 32 is shielded, and cannot be discharged by incident light on the spatial light modulator 20.

Turning now to FIG. 4, there is shown one pixel of DMD mirror array 22. Each pixel, generally shown at 35, is seen to comprise a reflective micromirror 36 fabricated upon and suspended over a pair of address electrodes 37. Each of address electrodes 37 is tied to one respective electrode line, E+ or E, bit line, as shown in FIG. 3, which are driven by the underlying charge storage cell 30. Each of charge storage cells 30 are fabricated in a substrate 38, as will be discussed shortly, these charge storage cells being coupled to and positioned between the pair of bit lines. Each mirror 36 is suspended by a pair of thin hinges 39 extending above substrate 38 (see FIGS. 6–13) by a pair of support posts 40. Mirror 36 is elevated above a beam 36a by a mirror support column 36b. Several electrically isolated landing pads 90 are provided upon substrate 38, with the two tips of each mirror beam 36a coming into contact with one respective landing pad finger when deflected by an electrostatic force in one of the two directions, as shown in FIG. 5. Electrodes 37 are suspended over respective electrode pads 88 by electrode supports 37a. In operation, one cell 30 provides a voltage to one electrode 37 to generate an electrostatic force with the mirror and induce mirror rotation. A voltage bias to mirror 36 via conductive posts 40, hinges 39, and beam 36a is usually pulsed to initiate rotation.

As shown in FIG. 5, mirror 36 can be deflected in one of two directions by providing a potential to one of the two address electrodes 37. When deflected in one direction, such as the "on" position, incident light is reflected to optics to ultimately illuminate a display screen or expose a light sensitive material on a photoreceptor drum. In the other "off" position, incident light is reflected to a light absorber, not shown. Each of the mirrors 36 can be deflected in one of these two directions, each modulating incident light and together, as an array, modulating incident light to form a light image. This light image is ultimately focused upon a display screen, or, focused upon the photoreceptor drum in the case of a printer, as discussed in the other cross referenced patents. If each mirror is in the "on" position, the light image would comprise of an array of bright pixels.

Referring back to FIG. 3, it can be seen that charge storage cell 30 is an electrically passive device. That is to say, there is no requirement for a power source, such as $V_{cc}$ required of the SRAM cell 10 shown in FIG. 1. Rather, each capacitor 32 is passive, with the polysilicon electrode storing charge provided thereto by the respective bit lines when the respective pass transistor 34 is enable by write line WL. For charge storage cell test and diagnostic verification, the functionality of each capacitor 32 of cell 30 can be verified by enabling the respective pass transistor 34, thus dumping a loaded charge of the polysilicon electrode back to the respective bit line and ultimately loaded back into the pixel data shift registers 28 of FIG. 2. A differential amplifier (not shown) is connected across the two electrode etches for sensing the charge differential. Thus, the present invention can be readily verified for functionality.

Because the charge storage cell 30 of the present invention does not require a power source, there is no requirement for power etches to be extended across the charge storage cell array 24. In addition, each charge storage cell 30 requires a fewer number of transistors and less substrate space than the prior art SRAM cell 10 of FIG. 1. Thus, the production yield of DMD 20 is very high, with no power etches being present to become shorted to one another during fabrication, and whereby one cell can be provided for each pixel mirror with the mirror having a size less than 17 microns. In addition, there is no power source to be shorted should one mirror collapse on the charge storage cell array. The semiconductor processing technique, as will be discussed shortly in regards to FIGS. 6–13, is robust MOS technology and is rather straight forward. As previously mentioned, one charge storage cell 30 can be provided for each pixel mirror 36. Thus, the entire array of charge storage cells 24 can be simultaneously reset by providing a reset voltage to each mirror 36. This, in turn, reduces the overall write cycle time to the charge storage cell array 24. Alternatively, one cell can be provided for a set of pixel mirrors to reduce the number of cells required.

Referring now to FIGS. 6–13, the semiconductor processing steps performed to fabricate charge storage cells 30 of array 24 will be discussed in considerable detail. Because each charge storage cell 30 is fabricated using a robust MOS process, reliable high-yield DMD devices 20 are obtained. The following FIGS. 6–12 are each discussed and are to be understood with reference to the previous Figure and a cross section of the fully fabricated charge storage cell 30 shown in FIG. 13. The fabrication of one charge storage cell 30 is provided for purposes of clarity.

Figure 6:
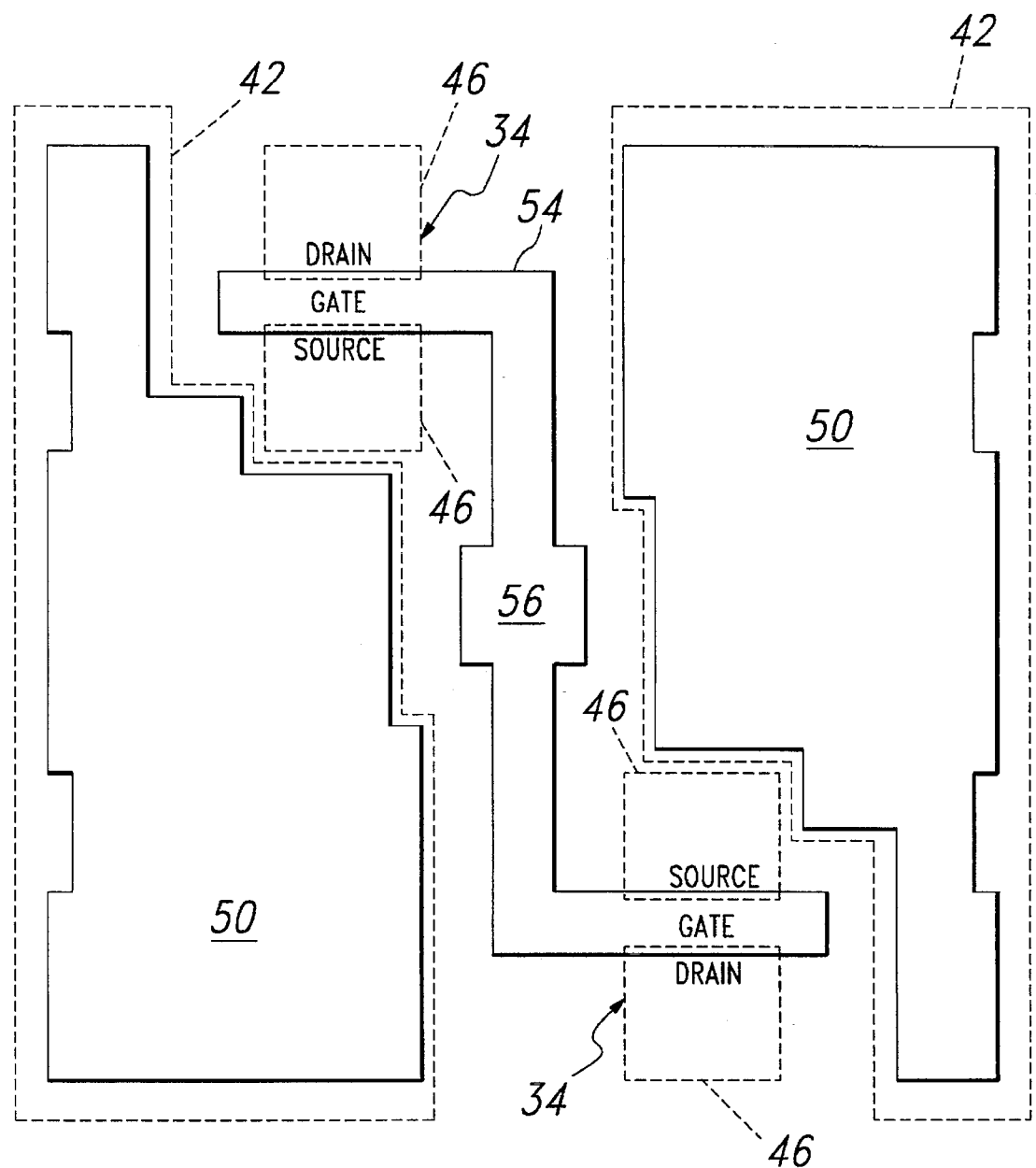
FIGS. 6–12 sequentially illustrate the various layers of semiconductor material which are processed to fabricate the charge storage cells, with one charge storage cell being shown for purposes of clarity.
Figure 13:
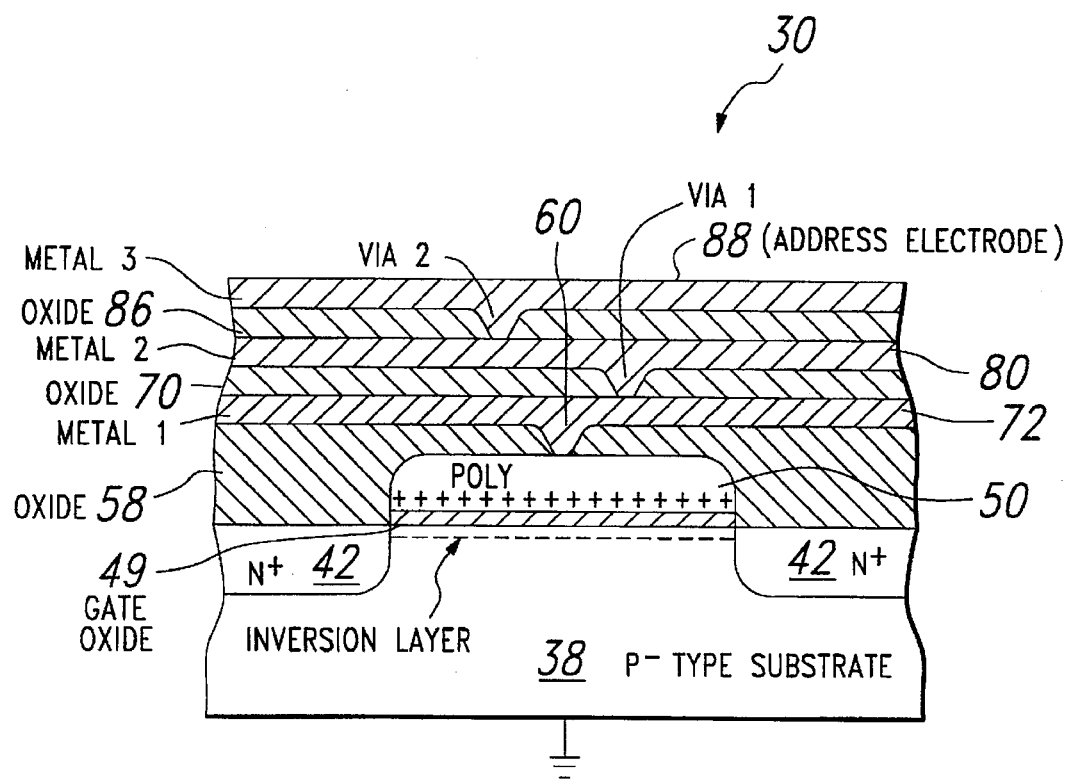
FIG. 13 is a cross section of one charge storage cell illustrating the buried capacitor having a large polysilicon electrode separated by a thin oxide dielectric from the underlying p-type substrate, and shielded by the metal-one, metal-two and metal-three semiconductor structure providing light impermeable shields, this cell being formed using robust MOS processes.

Referring now to FIG. 6 and FIG. 13, a thin layer of gate oxide 49 is grown over a p-type substrate 38. This thin layer of oxide 49 preferably comprises of silicon dioxide or silicon nitride, or a combination thereof, preferably having a thickness of about 150 angstroms, but is desirably as thin as possible and is limited by the reliability of process techniques. Thereafter, a pair of large polysilicon pads 50 and a z-shaped polysilicon etch having a contact pad 56 are formed by deposition and patterning. Then, the exposed (unmasked) portion of gate oxide layer 49 is removed.

Next, an n+ regions 42 is formed about the perimeter of each polysilicon pad 50 by ion implantation. At the same time, a pair of n+ regions 46 are formed by ion implantation about each end of etch 56, these n+ doped regions 46 forming the drain and source of pass transistors 34. The ting-shaped n+ doped regions 42 and the n+ doped regions 46 are self-aligning with the respective polysilicon pads 50 and the ends of etch 54. Etch 54 is ultimately connected upward to a writeline WL of an overlapping layer, as well be described shortly. These polysilicon pads 50 each form one electrode of one capacitor 32, with the underlying p-type substrate 38 forming the other electrode, and with the gate oxide layer 49 forming a thin dielectric therebetween. The ends of etch 54 form the gates of pass transistors 34.

The square area of each polysilicon electrode 50 is about 63 square micrometers. Due to the large surface area of both the electrodes 50 and the opposing p-type substrate therebelow, and with the thin layer of oxide disposed therebetween, a relatively high capacitance of approximately 170 fF or greater is achieved for each capacitor 32. The capacitance of each capacitor 32 is ultimately achieved by creating an inversion layer in the p-type substrate 38 by applying a positive voltage to the polysilicon electrodes 50, wherein the n+ doped region 42 serves as a minority carrier source, as will be discussed further shortly. In an alternative embodiment, electrodes 50 could comprise of metal, but polysilicon is preferred because it can be processed at higher temperatures.

Figure 7:
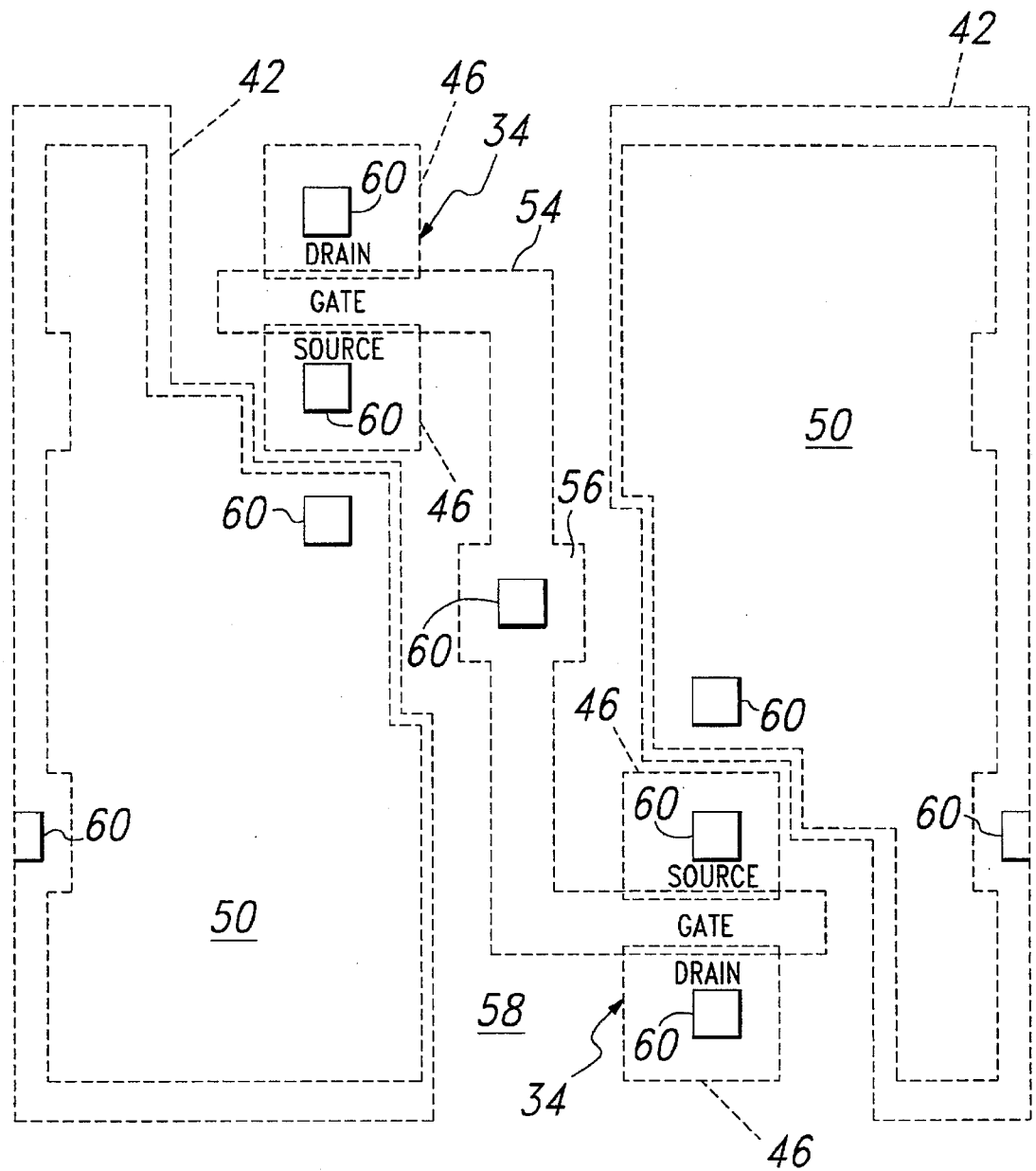

Turning now to FIG. 7, a first layer of field oxide 58 is applied over the partially processed wafer. A plurality of polysilicon contacts 60 are patterned through oxide layer 58 and upon each of the polysilicon electrodes 50, polysilicon pad 56, and upon each of the respective n+ doped regions 46 comprising the gate and source of MOS pass transistors 34. These contacts 60 provide an electrical interface upward from these components to upper levels of the circuit, as will be discussed shortly.

Figure 8:
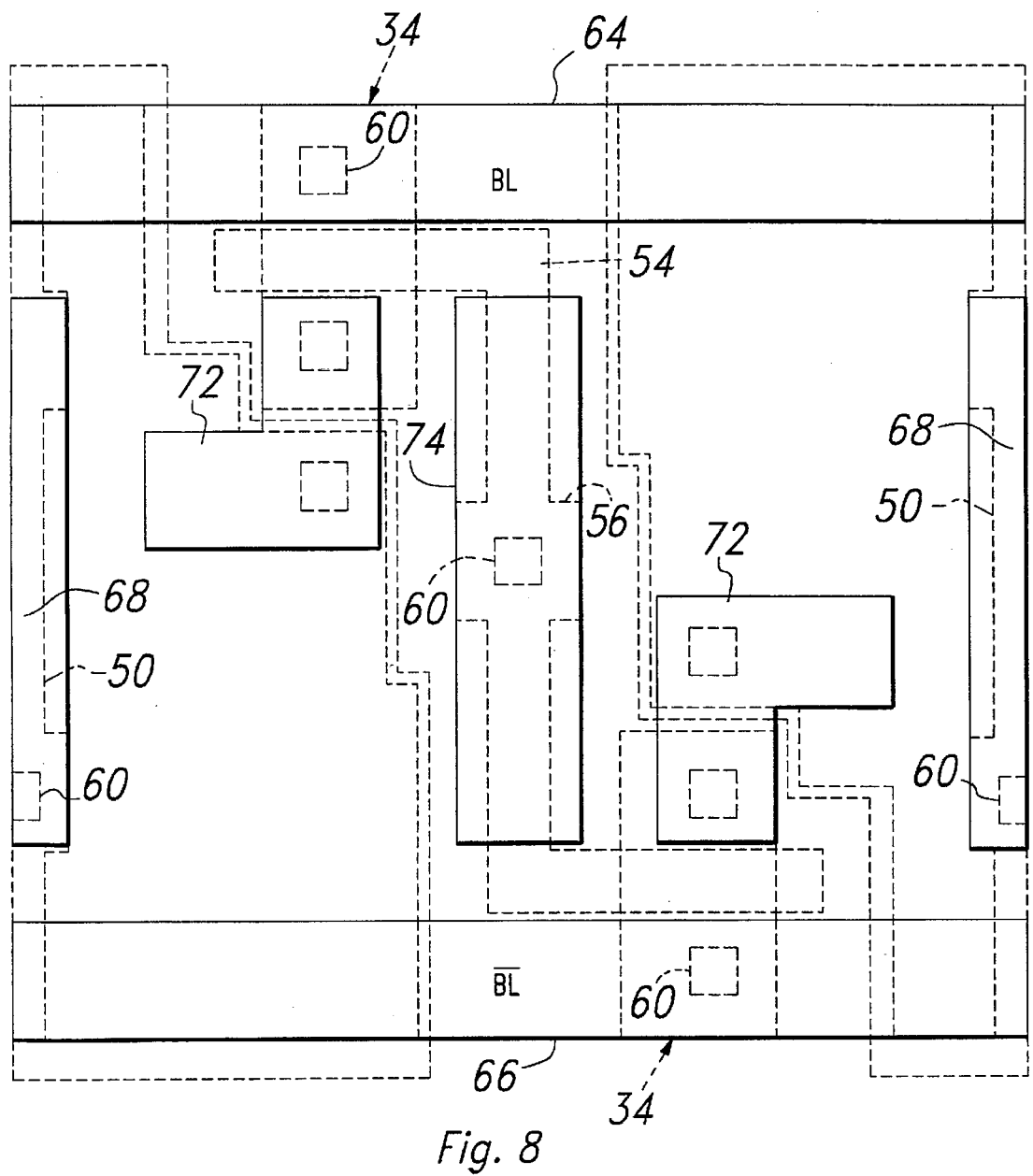

Turning now to FIG. 8, a first layer of metal, preferably aluminum and known as the metal-one layer, is applied by sputter deposition over the partially processed wafer of FIG. 7 and patterned to form a pair of bit lines BL and $\overline{BL}$, shown at 64 and 66. Also patterned is a pair of ground straps, shown at 68, perpendicularly interposed between the pair of laterally extending bit lines 64 and 66 and tied to the substrate. Bit lines 64 and 66 make contact with the respective contacts 60 thereunder to electrically connect the respective bit line to the drain of the respective pass transistor 34, as shown in FIG. 3. While the fabrication of only one charge storage cell 30 is being discussed, the bit lines 64 and 66 extend to and interconnect with the other associated charge storage cells 30 of a column, as previously discussed in regards to FIG. 3. Ground straps 68 connect to the n+ doped regions 42 via contacts 60, and also extend to the adjacent charge storage cells 30 to provide a common ground potential. These ground straps 68 are connected to the circuit substrate 38 at a plurality of locations to prevent a digital circuit bounce between each of the charge storage cells 30, overlap and shield a portion of the respective polysilicon electrodes 50, and tie portions of the light shield of metal-two to ground.

Also, during the patterning of this metal-one layer, a pair of L-shaped pads 72 are formed over the respective polysilicon contacts 60 to continue providing an electrical contact upward from each of the polysilicon electrodes 50, and to interconnect the source terminal of each respective pass transistor 34 to the respective polysilicon electrode 50 of capacitor 32 as shown in FIG. 3. A rectangular pad 74 is also fabricated over polysilicon pad 56 and portions of etch 54 (shown in FIG. 6) and is connected to the respective polysilicon contact 60 to continue providing an electrical contact upward to the word line WL, as will be discussed shortly. The portions of metal-one also form a light shield over portions of the underlying polysilicon electrodes and etch.

Figure 9:
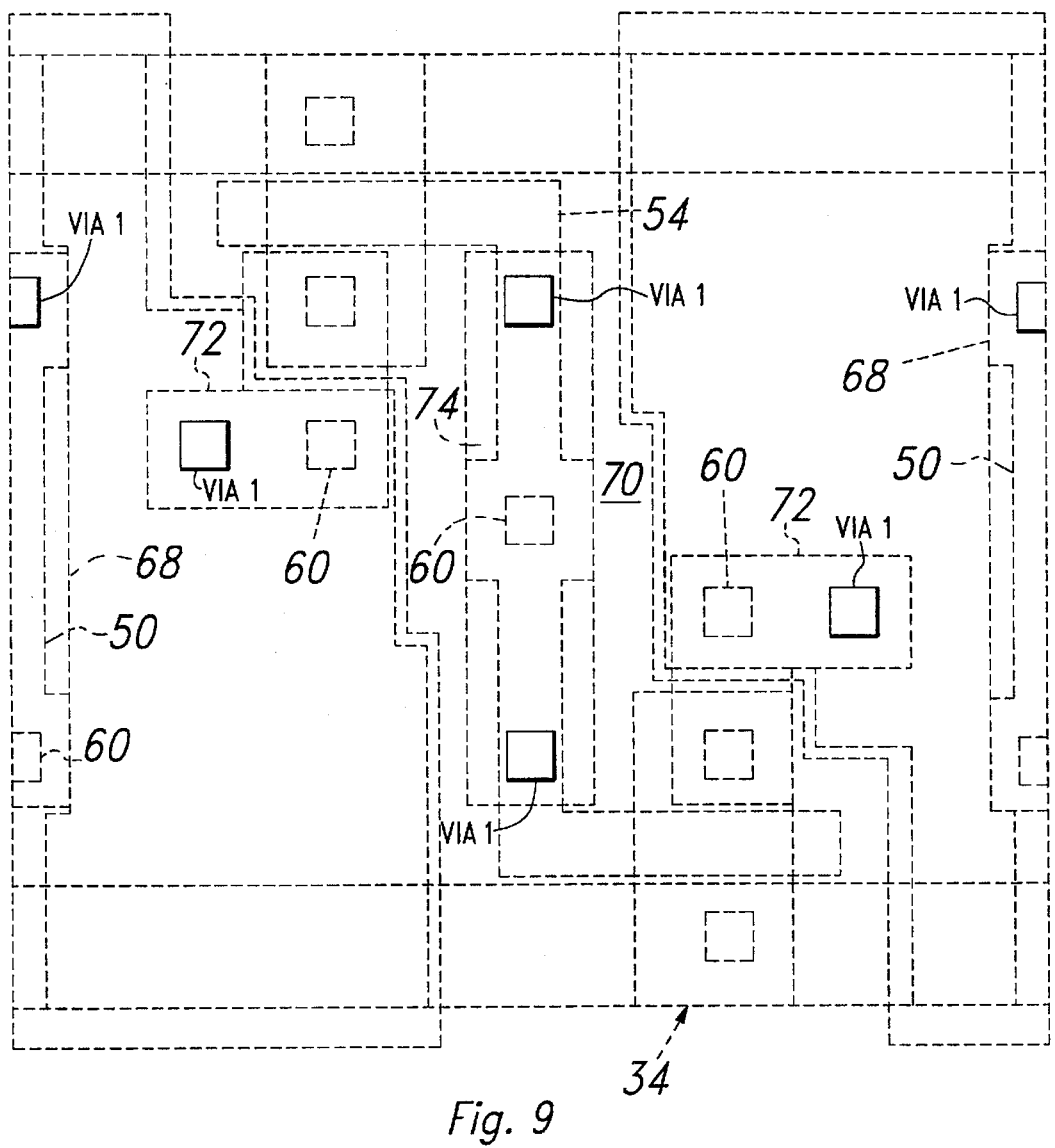

Now referring to FIG. 9, a second layer of field oxide 70 is deposited over the partially processed wafer of FIG. 8, wherein a plurality of openings for metal via contacts, labeled via-1, are patterned over each of pads 72, and over pad 74 to facilitate the electrical contact upward from each of the polysilicon electrodes 50 and the polysilicon writeline etch 54.

Figure 10:
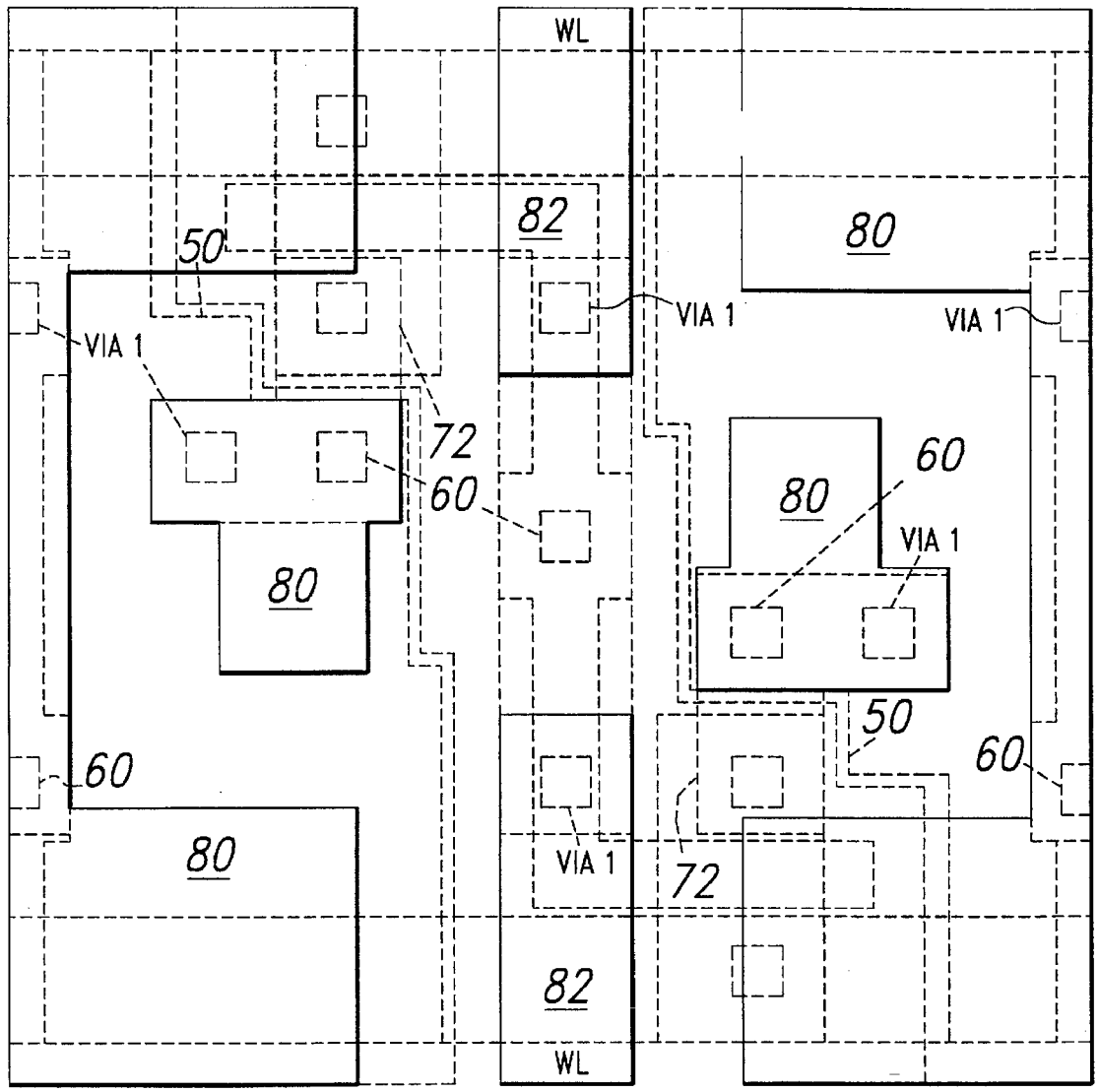

Turning now to FIG. 10, another metal layer, preferably of aluminum and known as metal-two, is sputtered deposited and patterned over the partially processed wafer of FIG. 9 to form four capacitor light shields 80, and a pair of vertically extending, interposed, write line etches WL shown at 82. As can be seen in FIG. 10, metal shields 80, together substantially overlap the respective polysilicon electrodes 50 of capacitor 32 and the associated n+ doped regions 42 to provide another light shield. In addition, the two T-shaped metal shields 80 can be seen to be electrically connected downward to the respective polysilicon electrode 50 by the associated via-1 formed this step to pad 72 and the respective polysilicon contact 60. The other two larger shields 80 are grounded down to the substrate 38 by the respective via-1, ground straps 68, and contacts 60. The write line etches 82 are electrically connected downward to the polysilicon etch 54 (FIG. 7) by the associated via-1, pad 74, and the associated polysilicon contact 60. With these relatively large light impermeable metal shields 80 overlapping each respective capacitor 32, incident light directed upon spatial light modulator 20 will not cause the underlying capacitors 32 to discharge. The two T-shaped metal shields 80 also serve as a electrical path upward from polysilicon electrodes 50 to electrodes 37, as will be discussed shortly.

Figure 11:
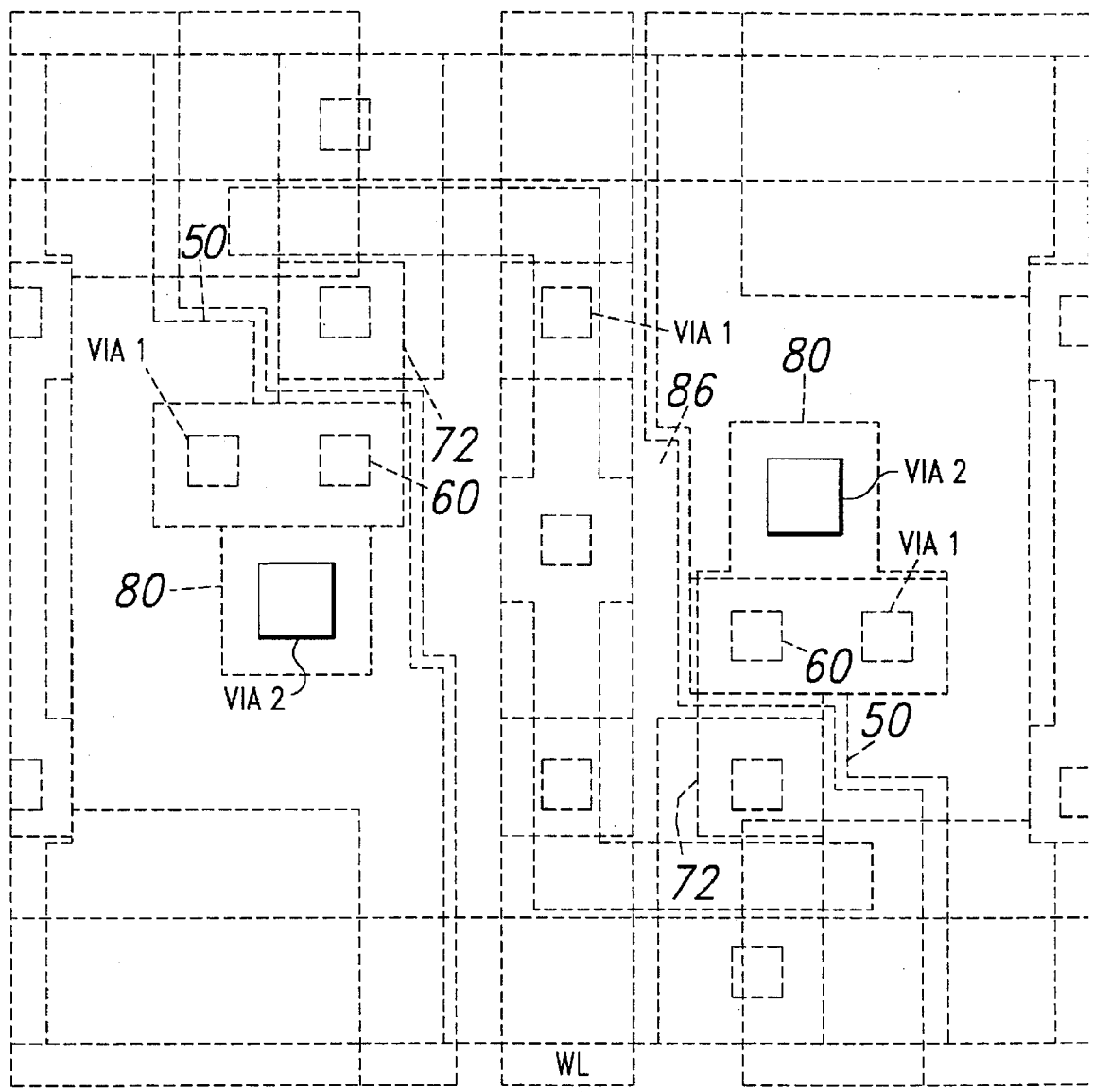

Turning now to FIG. 11, a third layer of field oxide 86 is deposited over the underlying partially processed wafer of FIG. 10, whereby a pair of openings for vias-2 are formed through this oxide layer, above the underlying T-shaped metal shields 80. Vias-2 provide a continuing electrical path upward from the polysilicon electrodes 50 of capacitors 34 to the address electrodes 37, shown in FIG. 4.

Figure 12:
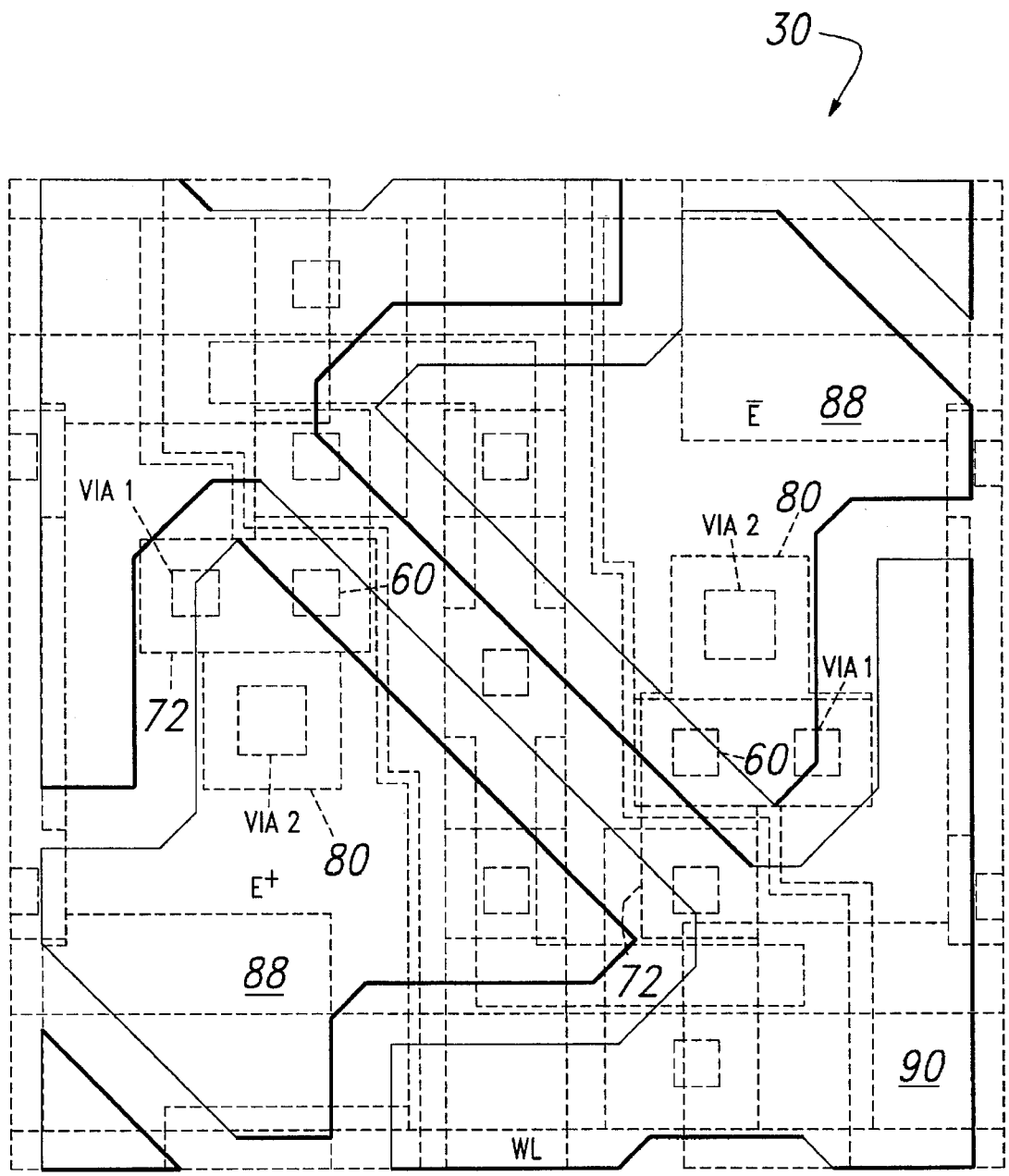

Now referring to FIG. 12, a pair of address electrode pads 88 are shown fabricated upon the underlying partially processed wafer of FIG. 11, with the underlying vias-2 formed this step. Electrode pads 88 are formed by sputter depositing another metal layer, preferably of aluminum and known as metal-three, then patterning this layer and etching to form the pair of electrode pads 88. Address electrodes 37 (FIG. 4) are ultimately fabricated upon pads 88. Thus, a complete electrical path is established between the respective address electrodes 37 and the underlying respective polysilicon electrode 50 of the respective capacitor 32. Also, bias and landing pad 90 is formed this step. Support posts 40 are fabricated on pad 90 at a later step. The substantial coverage of metal-three provides a light shield to the underlying polysilicon electrodes 50 and etch 54.

The remaining portions of pixel 35 shown in FIG. 4, including the posts 40, the hinges 39, and the mirror 36, are fabricated upon this underlying charge storage cell 30 using well known processing steps.

Referring to FIG. 13, a cross section of this fabricated charge storage cell 30 is shown to illustrate the interrelation of the layers that are deposited and patterned according to the description associated with FIGS. 6–12. As previously discussed, each of capacitors 32 are formed by the respective polysilicon electrode 50 separated by the thin layer of gate oxide 49 from the underlying p-type substrate 38. The n+ doped region 42 provide a source of minority carriers, with these capacitors 32 being formed using well known, robust, MOS processing techniques. When a positive potential is applied to the polysilicon electrode 50 of capacitor 32, an inversion layer is formed at the surface of the underlying p-type substrate. This capacitor 32 has a large capacitance, and a charge is not easily discharged by light incident on DMD 20 since capacitor 32 is shielded by the portions of metal-one, the metal-two shields 80, and the extensive structure of metal-three. The inversion layer formed when the capacitor is charged is not easily degraded by incident light which may defract around the metal shields of metal-one, metal-two and metal-three.

In summary, the DMD spatial light modulator 20 has an array of charge storage cells 30. These charge storage cells are passive and do not require a power source, require fewer transistors than an SRAM cell, and thus can be laid out with a simple design that can be processed with a high production yield. With no power sources proximate the mirrors, a collapsed mirror will not short power buses. Each of these capacitors 32 are formed using robust MOS processes, and have several light impermeable shields to aid in inhibiting incident light on SLM 20 from discharging the underlying capacitors 32. One charge storage cell 30 can be associated with each pixel mirror 36 of the DMD mirror array 22, each mirror 36 able to be reset simultaneously by applying a single reset pulse on the reset control line (not shown) to mirror 36. Thus, the data loading architecture for charge storage cell array 24 is rather simple, with only a single reset pulse needing to be applied to each mirror 36 of the entire mirror array per picture frame. Alternatively, one cell can be provided for a set of pixel mirrors to require fewer charge storage cells.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications. For instance, pass transistors 34 could be designed to be PMOS-type devices. In addition, other design patterns of the polysilicon and metal layers could be implemented, such as trench capacitors, to maximize the capacitance of capacitors 32, and to maximize the coverage of the light shield portions of metal layers over the polysilicon electrode of capacitor 32 while still meeting design practice rules. Alternatively, an n+ well could be formed under polysilicon electrode 50 to form the other electrode of capacitors 34, and eliminating the ring-shaped region 42. Pass transistors 34 could also be formed by implanting the n+ regions 46 before depositing the polysilicon gate. In another variation, the capacitors 32 could be formed of a metal electrode over substrate, or even comprise a pair of metal layers forming a buried capacitor, such as metal-one and metal-two separated by a layer of field oxide.

We claim:

1. A monolithic spatial light modulator, comprising;
   a) a plurality of pixels; and
   b) control means connected to said pixels for controlling said pixels including an array of charge storage cells positioned under said pixels, each said charge storage cell comprising a multi-layered semiconductor structure including a substrate forming a capacitor with one electrode being said substrate.

2. The spatial light modulator as specified in claim 1 wherein said capacitors underlie at least one light impermeable layer.

3. The spatial light modulator as specified in claim 2 wherein said light impermeable layer comprises metal.

4. The spatial light modulator as specified in claim 2 wherein each said charge storage cell underlies a plurality of said light impermeable layers.

5. The spatial light modulator as specified in claim 2 further comprising a data bus, and said charge storage cell further comprising a pass gate coupled between said capacitor and said data bus.

6. The spatial light modulator as specified in claim 2 wherein said semiconductor structure includes a pair of data buses, a pair of pass gates and a pair of said capacitors, each said pass gate being coupled between one said data bus and one said capacitor.

7. The spatial light modulator as specified in claim 2 wherein said capacitor comprises one electrode being said substrate of said semiconductor structure, and another electrode comprised of metal.

8. The spatial light modulator as specified in claim 1 wherein said capacitor comprises one electrode being said substrate of said semiconductor structure, and another electrode extending thereover comprised of polysilicon.

9. The spatial light modulator as specified in claim 8 wherein said polysilicon electrode overlaps said substrate electrode, and is separated therefrom by a thin dielectric oxide layer.

10. The spatial light modulator as specified in claim 8 wherein said substrate electrode is encompassed by a complimentary doped region.

11. The spatial light modulator as specified in claim 10 wherein said substrate is of p-type, and said complimentary doped region is n+ doped.

12. The spatial light modulator as specified in claim 1 wherein said pixels each comprise a deflectable mirror, and said control means includes an address electrode coupled to one said charge storage cell.

13. The spatial light modulator as specified in claim 12 wherein said address electrode is positioned over one said charge storage cell.

14. The spatial light modulator as specified in claim 13 wherein said address electrode is electrically coupled to said capacitor.

15. The spatial light modulator as specified in claim 1 wherein each said pixel is associated with one said charge storage cell.

16. The spatial light modulator as specified in claim 1 wherein one said charge storage cell is associated with a plurality of pixels.

* * * * *